United States Patent [19]  [11] 3,804,698
Kinloch  [45] Apr. 16, 1974

[54] ADHESIVELY RELEASABLE AND REUSABLE SHOCK LOAD ABSORBING SYSTEM

[75] Inventor: James C. Kinloch, El Centro, Calif.

[73] Assignee: The United States of America as represented by the Secretary of the Navy, Washington, D.C.

[22] Filed: May 25, 1970

[21] Appl. No.: 40,143

[52] U.S. Cl............................ 161/7, 2/3, 156/344, 156/584, 161/74, 161/88, 161/99, 161/102, 161/125, 161/406, 182/3, 244/147, 244/151
[51] Int. Cl....................... A62b 35/00, B64d 17/30
[58] Field of Search............... 182/3, 4, 5; 2/3, 338, 2/331; 244/147, 148, 149, 151; 161/49, 50, 51, 52, 53, 74, 89, 92, 102, 108, 125, 167, 406; 156/344, 584

[56] References Cited
UNITED STATES PATENTS

| 3,519,529 | 7/1970 | Cook | 161/404 |
|---|---|---|---|
| 3,444,957 | 5/1969 | Ervin | 182/3 |
| 2,749,262 | 6/1956 | Wiser | 161/125 |
| 2,053,116 | 9/1936 | Sperry | 161/99 |
| 2,739,703 | 3/1956 | Giles | 161/99 |

Primary Examiner—George F. Lesmes
Assistant Examiner—James J. Bell
Attorney, Agent, or Firm—R. S. Sciascia; George J. Rubens; J. W. McLaren

[57] ABSTRACT

A shock-absorbing strap system including a tensile load-bearing basic strap which has a looped portion secured by an adhesive connection designed to fail in above-load conditions to absorb the initial shock before transferring the load to the basic strap.

7 Claims, 5 Drawing Figures

INVENTOR.
JAMES C. KINLOCH
BY
George J. Rubens
ATTORNEYS 3,804,698

ADHESIVELY RELEASABLE AND REUSABLE SHOCK LOAD ABSORBING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to shock absorbing systems and more particularly with such a system employing a fabric-like strap having an adhesively secured release connection.

Numerous systems have been employed for absorbing shock, especially in situations involving personnel or shock-sensitive equipment. Such uses include but are not limited to snatch forces and opening shock loads in parachute deployments for the recovery of personnel, cargo, ordnance, or space vehicles. Barriers for the recovery of aircraft, such as on aircraft carriers, not stopped by normal deceleration procedures also require shock-absorbing lines. In addition, the need for attenuating shock arises in tow lines which may be subjected to transient loads in excess of breaking strength.

Shock-absorbing devices relying on die-drawing or bending of metal may be effective at low strain rates but are rate sensitive so as to be undependable and prone to failure at high rates. The drawing of high elongation polymers, elastomers, etc. can produce high energy absorption-to-weight ratios but suffer the disadvantage of becoming progressively less energy-absorbing without a readily detectable change in appearance.

One of the most common techniques in the art for absorbing energy is by the peeling of sewed straps or tapes. While this type of absorbing system has been the most inexpensive and effective of prior art methods, nevertheless, there are critical disadvantages in that it is still relatively expensive requiring special sewing machines and skilled operators; the precise strength of the connection is difficult to control being quite variable; and most important is the propensity to failure by tearing of the basic strength member instead of the tear or secondary member, resulting in an inherent weakness in the strap system and preventing reuse.

SUMMARY OF THE INVENTION

A reusable shock-absorbing system is provided for a fabric-like strap system wherein an adhesive connection having a predetermined shear strength is used to absorb some of the initial load applied to the system. In one of the preferred embodiment the basic strap is formed with an intermediate loop portion. A secondary or tear strap, having a shorter length than the basic strap, may be secured on at least one side of the basic strap to bridge the loop by an adhesive having a predetermined shear strength less than that of the tear strap or the basic strap. The tear strap is constructed of a material having a greater degree of elasticity than the basic strap whereby when the strap system is subjected initially to a higher than normal shock load the tear strip, being shorter, elongates to absorb some of the energy. Within this loading limit the system is recoverable and reusable without the need for repair. However, upon still greater loading, such that would otherwise destroy the cargo, the carrier, or the basic strap, the adhesive bonding fails, and in doing so absorbs the additional load at which time the load is transferred to the basic strap. Additional bonded areas can be provided to provide a series of successive load-absorbing connections.

STATEMENT OF OBJECTS OF THE INVENTION

An important object of this invention is to provide a load-absorbing strap system in which the component parts can be reusable or readily repairable if damaged.

Another important object is to provide such a strap system that can be easily fabricated without the need for special tooling or skills.

Still other objects are to provide such a system which has a high degree of flexibility and control with regard to the shear strength; and which is lightweight and low in cost.

Other object, advantages and novel features of the invention will become apparent from the following detailed description of the invention when considered in conjunction with the accompanying drawings.

DESCRIPTION OF THE PREFERRED EMBODIMENT

Figure 1:
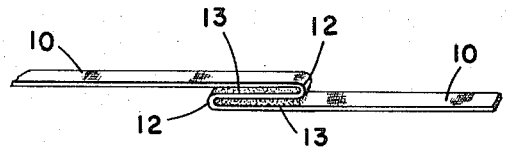
FIG. 1 shows a side isometric view of a section of a basic shock-absorbing strap system wherein the basic strap has a double fold secured by a pre-selected adhesive to provide a predetermined tensile load-attenuating connection.

Referring to the drawing where like reference numerals refer to similar parts throughout the figures there is shown in FIG. 1 a fabric-like strap 10 which may be an integral portion of any load-bearing strap system, which by way of example only may be a portion of the webbing in a parachute rigging (not shown). In order to protect the basic stap system for destruction, and safety of the personnel or the cargo being supported from higher-than-normal shock loads, some means for dissipating or attenuating an above-normal shock load is desirable.

In the present invention this overload condition is accomplished in one embodiment by providing a pair of loops or bights 12 in strap 10 at appropriate locations along its length. It is apparent that other configurations of the bights is feasible within the scope of this invention. In a broad aspect of the invention, as shown in FIG. 1, one or more shock attenuating connections can be provided in the basic strap system by applying a pre-selected adhesive 13 between one or more of the loops or folds 12. The type of adhesive is selected from a group so that the bonded area is structurally weaker than the strength of basic strap 10 and which will provide the desired amount of shock-absorbing properties. Accordingly, when an above-normal tensile load is applied on the basic strap the adhesive bond fails and in so doing the connection absorbs and attenuates the initial shock load.

Figure 2:
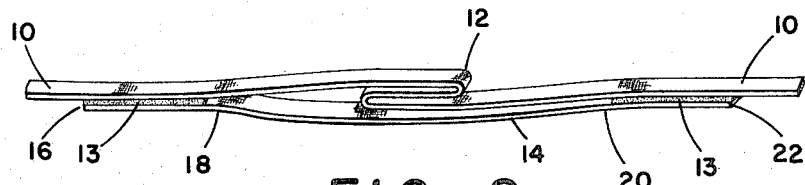
FIG. 2 is a side elevation of modified shock-absorbing strap system using a single tear shape adhesively secured to the basic strap.
Figure 3:
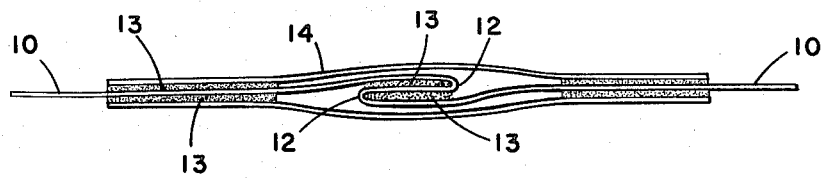
FIG. 3 is an exploded side elevation view of another modified strap system employing a pair of tear straps one on each side of the folded area.
Figure 4:
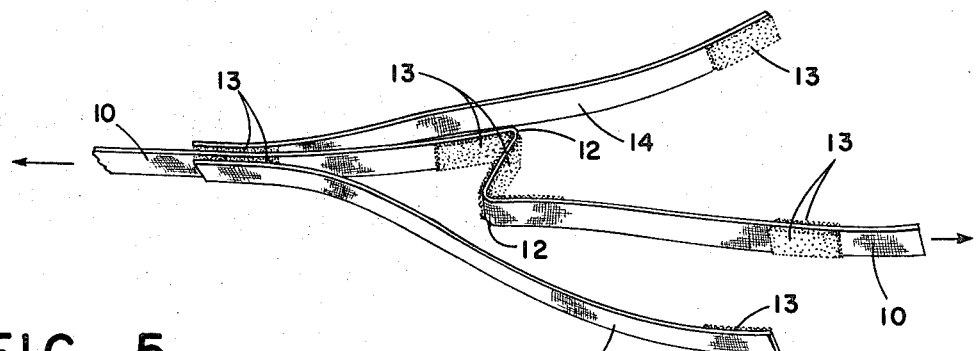
FIG. 4 shows an isometric view of the release area of FIG. 3 after a higher-than-normal shock load has sheared both the folded area and tear straps loose from the basic strap system while absorbing some of the shock energy in each releasing action.
Figure 5:
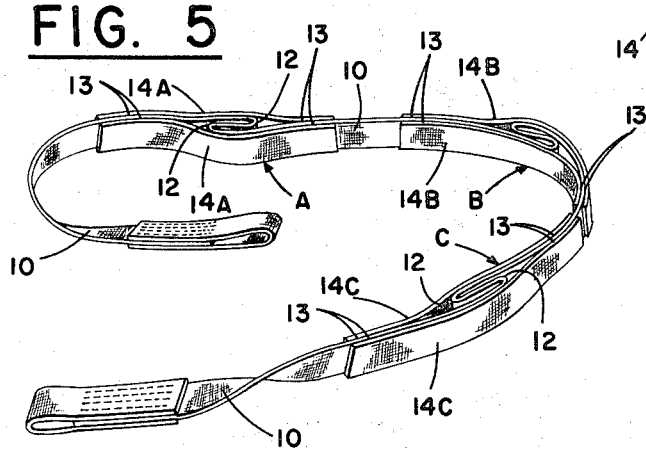
FIG. 5 is an isometric view of another modified strap system illustrating three spaced release connections designed to act sequentially to absorb an applied load.

In FIG. 2 a modified shock-attenuating connection is provided by using one or more secondary or tear straps 14, one being illustrated, having their ends secured to the basic or load bearing strap 10 between points 16 to 18 and 20 and 22, freely bridging over loop 12. Although one tear strap 14 is shown attached to a side of basic strap 10 in FIG. 2, greater attenuation can be obtained if two straps are utilized, one on each side of the fold, as shown in FIGS. 3–5. As will be later illustrated, additional shock attenuation could be achieved by also using adhesive in the folds 12, as used in FIG. 1.

It is important that the secondary straps also be secured at areas 16–18 and 20–22 by means of the adhesive 13. The type of adhesive employed in this invention depends on the type of fabric material of which basic strap 10 is constructed, and the desired tear strength. For example, with a basic strap 10 constructed of woven nylon a synthetic latex adhesive manufactured by the Uniroyal under No. M6230 has been found in tests to be satisfactory, reducing the peak loads by approximately 50 percent.

Another important feature is that tear strap 14 has a lesser yield strength than that of basic strap 10, that is, the tear strap 14 should yield or elongate under an above-normal tensile load before basic strap 10 yields to absorb some of the initial load on the basic strap. Up to this amount of loading, the strap system is recoverable and reusable. However, should the magnitude of the load increase beyond that which can be absorbed through the elongation of tear strap 14 such that it would destroy the webbing, the carrier, or subject the load, i.e., personnel or cargo, to injury, the adhesive bond between tear strap 14 and the basic strap 10 is designed to fail. The adhesive bond will fail in such a manner as to absorb additional energy, as shown in FIG. 4, transferring the entire load (as indicated by the arrows) to basic strip 10. The release connections have completed their attenuating function. It has been observed that with the invention both a shearing and peeling-off action occurs, the shearing providing a high initial release followed by a gradual release through the peeling-off action.

The basic load bearing webbing system can be made more energy absorbing in several ways and/or combinations. As previously mentioned the extent of the adhesive bonding area can be increased between the tear strip 14 and the basic bond. Another manner of accomplishing the same result is the judicious selection of a type of adhesive having stronger bonding properties. Still another manner is by making one of the two tear straps 14 in FIGS. 3–5 with a greater degree of stretchability than the other. Still an additional manner of accomplishing this result is shown in FIG. 5 by sequential attenuation of the load. A plurality of release connections A, B, and C are arranged in spaced relation along strap 10. Each connection is of similar construction but varying in such a manner as to permit sequential release. The variation in release strength can be accomplished by using different adhesives or any of the above-described techniques. For purposes of illustration the pairs of tear straps 14A, 14B and 14C may be progressively longer in length and providing with corresponding larger adhesive areas whereby as the tensile load increases straps 14A will fail first in time, thence straps 14B, and finally straps 14C at which time the entire tensile load is assumed by basic strap 10.

The use of an adhesive for such a release system was discovered to be non-destructive to the basic strap system 12 as compared to use of threads by stitching as has long been the practice in the parachute arts. Besides such obvious advantages as simplicity in application without the need for special sewing machines and accompanying skills not always available in advance areas during wartime conditions, the most important discovery was that the adhesive does not damage the basic strap either in the application or during the release operation at which time a peeling-off action and/or shear action occurs. Since needles are not used there is no cutting or other damages to the fabric during fabrication. And, whereas the threads have a tendency to tear the woven fabric of the basic strap when the tear strap is ripped off, such action does not occur with the use of adhesives. Furthermore, since the basic strap system is not weakened after release of the connection, the strap can be re-glued and reused on site reducing the requirement for large parachute inventories.

Obviously many modifications and variations of the present invention are possible in the light of the above teachings. It is therefore to be understood that within the scope of the appended claims the invention may be practiced otherwise than as specifically described.

What is claimed is:

1. A shock-absorbing parachute webbing strap system comprising solely:
   a basic tensile load bearing webbing strap of a given length having a predetermined tensile yield strength, at least one intermediate and intermittent portion of said strap having a loop;
   at least one secondary strap extending longitudinally the basic strap to bridge said looped portion and having a shorter length than the basic strap;
   said secondary strap having a lesser yield strength than that of the basic strap;
   contiguous portions of both straps on each side of the looped portion being secured together by an adhesive having a shear strength less than the yield strength of the basic strap;
   whereby application of an above-normal tensile shock load on said strap system causes the secondary strap to elongate to absorb the initial shock until a predetermined magnitude of load is reached to cause the adhesive bond to fail transferring the entire load on the basic strap.

2. The strap system of claim 1 wherein:
   the looped portion is folded with the contiguous overlapping contacting surfaces also secured together by an adhesive having a different predetermined shear strength whereby shock absorption is achieved gradually by a peeling-off of the overlapping surfaces.

3. The strap system of claim 1 wherein:
   two secondary straps are provided one on each side of the looped portion of the basic strap to provide a sandwiched relationship to provide a release connection.

4. The strap system of claim 3 wherein:
the secondary straps have different tensile yield strengths.

5. The strap system of claim 3 wherein:
the secondary straps and their respective adhesives have different yield strengths.

6. The strap system of claim 3 wherein:
a plurality of spaced release connections are provided along the basic strap system, each area having a different shear strength to provide a sequential absorption of the load before it is transferred to the basic strap.

7. The strap system of claim 6 wherein:
the sequential action is provided by varying the extent of contacting area of the straps to be adhesive secured.

* * * * *